US012042797B2

(12) United States Patent
Perry

(10) Patent No.: US 12,042,797 B2
(45) Date of Patent: Jul. 23, 2024

(54) BIODEGRADABLE PIPETTE TIP RACK

(71) Applicant: Mettler-Toledo Rainin, LLC, Oakland, CA (US)

(72) Inventor: Brian Perry, Oakland, CA (US)

(73) Assignee: Mettler-Toledo Rainin, LLC, Oakland, CA (US)

( * ) Notice: Subject to any disclaimer, the term of this patent is extended or adjusted under 35 U.S.C. 154(b) by 19 days.

(21) Appl. No.: 17/532,703

(22) Filed: Nov. 22, 2021

(65) Prior Publication Data

US 2023/0158509 A1 May 25, 2023

(51) Int. Cl.
*B01L 9/00* (2006.01)

(52) U.S. Cl.
CPC ......... *B01L 9/543* (2013.01); *B01L 2300/042* (2013.01); *B01L 2300/0832* (2013.01); *B01L 2300/0858* (2013.01); *B01L 2300/126* (2013.01); *B01L 2300/16* (2013.01); *B01L 2300/165* (2013.01)

(58) Field of Classification Search
CPC ............... B01L 9/543; B01L 2300/042; B01L 2300/0832; B01L 2300/0858; B01L 2300/126; B01L 2300/16; B01L 2300/165
See application file for complete search history.

(56) References Cited

U.S. PATENT DOCUMENTS

| | | | | |
|---|---|---|---|---|
| 6,286,678 | B1 * | 9/2001 | Petrek | B01L 9/543 422/526 |
| 2010/0166616 | A1 * | 7/2010 | Price | B01L 9/543 422/400 |
| 2012/0328489 | A1 | 12/2012 | Beese et al. | |
| 2016/0001292 | A1 | 1/2016 | Motadel et al. | |
| 2017/0008001 | A1 * | 1/2017 | Motadel | B01L 9/543 |
| 2019/0275528 | A1 * | 9/2019 | Rethwisch | B65D 25/108 |
| 2021/0339259 | A1 | 11/2021 | Motadel et al. | |

* cited by examiner

*Primary Examiner* — Jill A Warden
*Assistant Examiner* — Alex Ramirez
(74) *Attorney, Agent, or Firm* — Standley Law Group LLP; Jeffrey S. Standley; Adam J. Smith

(57) ABSTRACT

An environmentally enhanced pipette tip rack includes a molded fibrous cellulose shell and an injection molded plastic tip deck; the shell and other features of the rack are configured for strength, minimal contamination, and to be biodegradable, compostable, or recyclable.

24 Claims, 6 Drawing Sheets

BIODEGRADABLE PIPETTE TIP RACK

FIELD OF THE INVENTION

The invention relates to pipette tip racks, and particularly to biodegradable, compostable, and recyclable racks for arrays of consumable air displacement pipette tips.

BACKGROUND OF THE INVENTION

Air displacement pipettes, in which a simple handheld pipette moves a piston through an air-tight seal to aspirate or dispense liquid in a disposable pipette tip, are commonly found in scientific laboratories and manufacturing sites across a wide spectrum of disciplines, from medical and pharmaceutical research to genetics and forensics. Pipettes are used by workers in such laboratories and other settings to handle and dispense small quantities of liquids, from one microliter (or less in some cases) up to ten or more milliliters. In many cases, these workers perform repetitive dispensing tasks all day long, and end up handling hundreds of samples per day. And especially where multichannel pipettes are being used, the number of samples handled per day may be in the thousands.

To avoid cross-contamination, air displacement pipette tips are usually used once and discarded—they are treated as disposable or consumable. And because air displacement pipettes are convenient and efficient, allowing for the handling of hundreds or thousands of samples per day, handheld single and multichannel pipetting devices use very many disposable tips. A pipetting worker handling many samples needs a convenient supply of replacement tips close at hand.

Most commercially available pipette tips are made available in injection molded plastic racks, each rack containing 96 tips in an 8×12 array. This physical configuration easily and conveniently accommodates single channel pipettes (that use a single tip at a time, selected from the 96 in a box) and multichannel pipettes in a variety of configurations (1 row×6 channels, 1×8, 1×12, 2×8, 2×12, etc.). Traditional racks are usually fabricated from a relatively rigid polymer (such as polypropylene or polycarbonate) that is robust and easily able to withstand the forces encountered in mounting tips to a single-channel or multichannel pipette.

A rack is usually provided in the form of a box with a lid (either hinged or removable) with tips suspended in an array of openings defined by a deck held in the box and revealed when the lid is opened. Pipette tips are generally tapered in shape, with a narrow distal end and wider proximal mount, and accordingly, the mount ends of the array of tips can be positioned above the openings in the deck while the narrow distal ends extend through the openings in the deck. History has shown that this is a convenient way of storing tips and making them available for use—a user can simply press the shaft of a pipette into a tip (or in the case of a multichannel pipette, press the row or rows of nozzles into a corresponding row or rows of tips in the rack), ensure the tips are mounted by applying pressure against the rack and deck, and then simply lift the tip or tips out of the openings to use them.

While this tip rack design has been used throughout the world for many years, when empty, it produces incalculable amounts of persistent environmental plastic waste upon disposal.

When all of the tips in a rack are used, the rack is empty and is either discarded or refilled.

Some pipette users favor tip refill systems, and to the extent such refill systems have been successful, they have been simple and easy to use, requiring minimal extra steps.

One example of a successful single-use pipette tip refill system is available from Rainin Instrument, LLC, under the GREEN-PAK trademark. This product is described in U.S. Pat. No. 5,392,914, which is hereby incorporated by reference as though set forth in full. In a GREEN-PAK refill package, an array of 96 tips is held in a replacement tip wafer or plate within a thermoformed "blister" package that is sealed at one end—the end covering the narrow distal ends of the pipette tips—with a peelable, non-replaceable cover that seals the package. To refill a pipette tip rack, the GREEN-PAK refill package is opened by peeling the cover off, the array of tips is positioned carefully over the corresponding supportive deck or grid in the empty tip rack, and the tips (and the tip wafer) are pushed out of the GREEN-PAK package by deforming the thermoformed blister package. The wafer is then snapped into place and held by retainers in the deck or grid. The GREEN-PAK blister package thermoform is thin and flexible and uses minimal material; provides protection for the pipette tips during shipment and storage. The GREEN-PAK blister is also made from a more recyclable plastic type. However, it is not possible to mount tips directly from a GREEN-PAK package, not only because the tips are inverted (with the narrow ends facing out), but because the package is too flexible to withstand the pressure required to mount tips onto a pipette shaft. The GREEN-PAK refill package, while convenient, still requires a rack-loading step and extra handling.

The SPACESAVER tip refill package from Rainin Instrument, LLC, makes even more efficient use of materials and space. A SPACESAVER tip refill package includes eight or ten refills (768 or 960 tips) in approximately the space occupied by 1-2 traditional pipette tip racks or a single GREEN-PAK refill. The original SPACESAVER system is described in U.S. Pat. No. 5,441,702, which is hereby incorporated by reference as though set forth in full. The original SPACESAVER refill module included the aforementioned rack and a thermoformed sleeve holding, in total, eight or ten nested arrays of tips. A re-designed SPACESAVER has eliminated the rack but retains the thermoformed sleeve. To fill an empty rack, a user positions the sleeve over the rack, aligns the tips, and pushes down on the nested arrays; the bottom array and corresponding tip deck snaps into place within the rack and the others slide down one level and can be removed and stored for future use. The SPACESAVER tip refill system provides good storage efficiency and uses minimal materials, but does still require a loading step and once opened, sterility cannot be maintained. Moreover, because the SPACESAVER system employs nested tips, it is not suitable for refilling racks with tips that include aerosol resistant filters.

Various other tip refill systems are available from many pipette tip manufacturers. They are all relatively convenient to use, but are all less convenient than simply opening and using a new rack of pipette tips when needed. Even with the great improvements that have been made in tip refill systems over the past decades, many users still prefer single-use racks to avoid the hassle of refills. Some users may also have concerns over the cleanliness of the rack itself, and not just the tips. Ultimately, the empty racks require disposal and, in some manner, entry into the environment. Using single-use racks minimizes handling requirements (and the distractions arising therefrom), ensures a fresh rack is always available, and maintains sterility better than multi-pack refill systems. However, single-use racks, depending upon their composition, can be more profligate in the amount of disposable plastic waste that they generate.

Accordingly, there is a need to reduce the environmental impact of discarded pipette tip racks, not all of which will be recycled. This need is met by the replacement of plastic rack components with those that are largely cellulose-based and hence, compostable and/or biodegradable.

SUMMARY OF THE INVENTION

Accordingly, then, a pipette tip rack according to the invention is fabricated from a natural fibrous cellulose material that much of its composition will be, to various degrees, biodegradable, compostable, or recyclable. The rack includes a shell that is formed from a molded fibrous cellulose material, holding in place and storing within a lightweight molded plastic tip deck that accommodates an array of pipette tips. The shell includes features that retain the tip deck firmly in a desired seated position, and both the tip deck, cellulose shell and additional components are advantageously configured, harmoniously integrated, and reinforced to accommodate the forces received when a user presses a pipette against one or more tips on the deck to mount the tips to the pipette.

In an embodiment of the invention, the molded fibrous shell includes a box-shaped body and a separate form-fitting lid. The lid is configured with a peripheral lip structure that fits securely over a corresponding lip structure on the shell. The resulting interference or friction fit between the lid and the body serves to reduce the intrusion of dust and other contaminants into the pipette tip rack when the lid is closed.

A rack according to the invention further includes features in the shell that hold a pipette tip deck firmly in position, and a tubular cellulose sleeve that prevents tips in the deck from tilting and abrading an interior surface of the shell; preferably, the sleeve provides additional support and rigidity to the tip deck.

A pipette tip rack according to the invention may be used alone, on a flat surface such as a table or bench, or hand held, or held within a stabilizing base structure.

In comparison to those traditional rigid injection molded pipette tip racks, a pipette tip rack according to the invention provides considerable benefits, including: reduced plastic waste and associated environmental benefits, reduced weight, and potentially reduced manufacturing and shipping costs. Compared with single-use and multi-use refill packages, a pipette tip rack according to the invention may also have significant benefits: reduced handling and improved cleanliness and sterility. A pipette tip rack according to the invention can be sold in a pre-sterilized and shrink-wrapped condition (or otherwise protected, e.g., in flow wrap, bags, or TYVEK® packaging), ensuring contamination-free pipette tips are available at all times. A pipette tip rack according to the invention can be made available in individually wrapped packages or in multi-packs as desired.

BRIEF DESCRIPTION OF THE DRAWINGS

These and other objects, features, and advantages of the invention will become apparent from the detailed description below and the accompanying drawings, in which.

DETAILED DESCRIPTION OF THE INVENTION

The invention is described below, with reference to detailed illustrative embodiments. It will be apparent that a system according to the invention may be embodied in a wide variety of forms. Consequently, the specific structural and functional details disclosed herein are representative and do not limit the scope of the invention.

Figure 1:
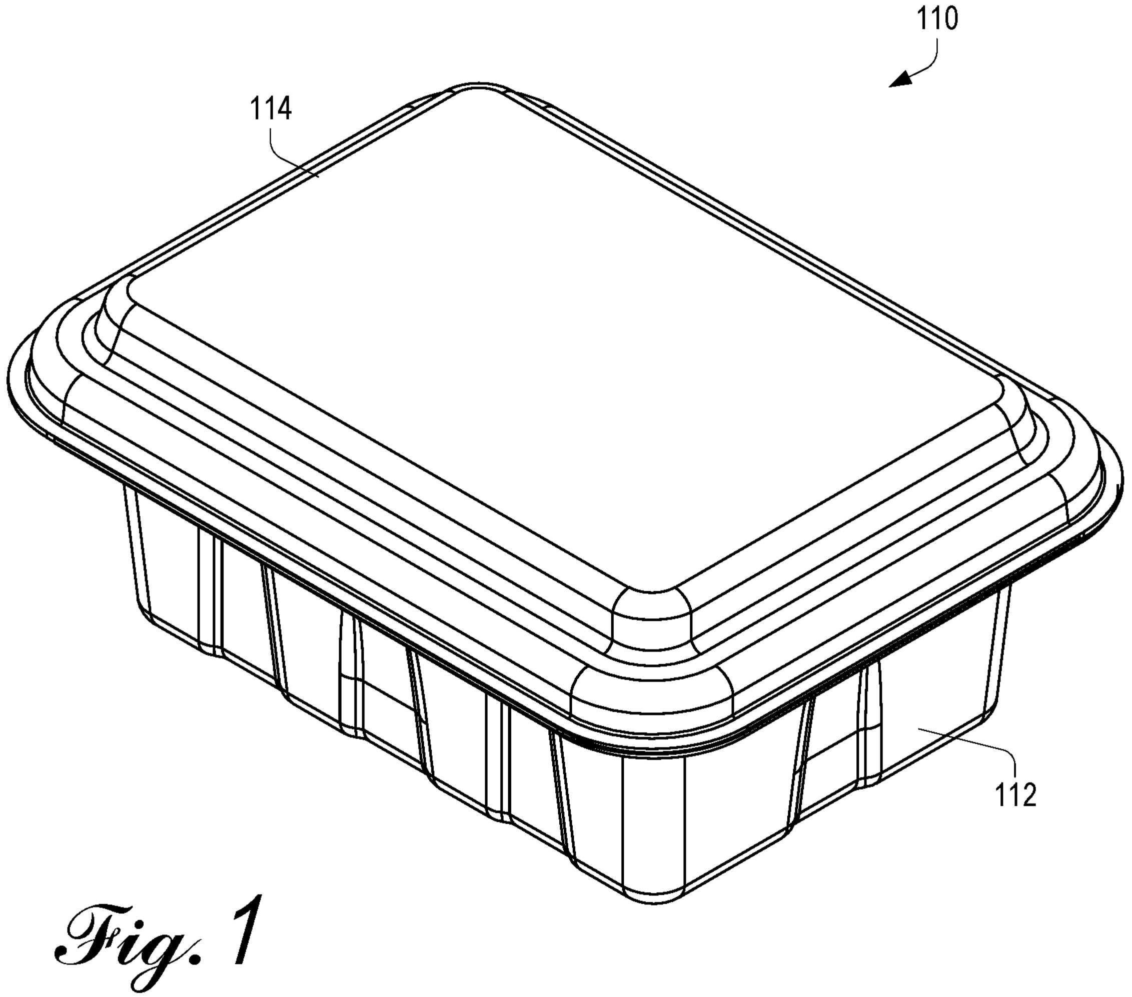
FIG. 1 illustrates an exterior view of a pipette tip rack according to the invention.

Referring initially to FIG. 1, a pipette tip rack 110 according to the invention is illustrated. The pipette tip rack 110 includes a generally tapered box-shaped body 112 with rounded corners and a cooperative lid 114, each of which is fabricated from a biodegradable material such as molded cellulose fiber pulp. As used herein, the term "biodegradable" may refer to materials that are capable of being degraded (either by natural or induced conditions) over the course of time after use, and may include materials generally regarded as biodegradable, compostable (e.g., likely to break down under certain conditions of temperature and moisture), and recyclable (e.g., capable of being broken down and reused). The term "cellulose fiber" may refer to any suitable naturally derived or artificially created fibrous material, including (for example) bamboo fiber, pre- or post-consumer recycled paper fiber, bagasse (such as from sugar cane), in various combinations and proportions or blended with other materials, and either untreated or with an additive or surface treatment to improve the performance characteristics of the material.

Figure 2:
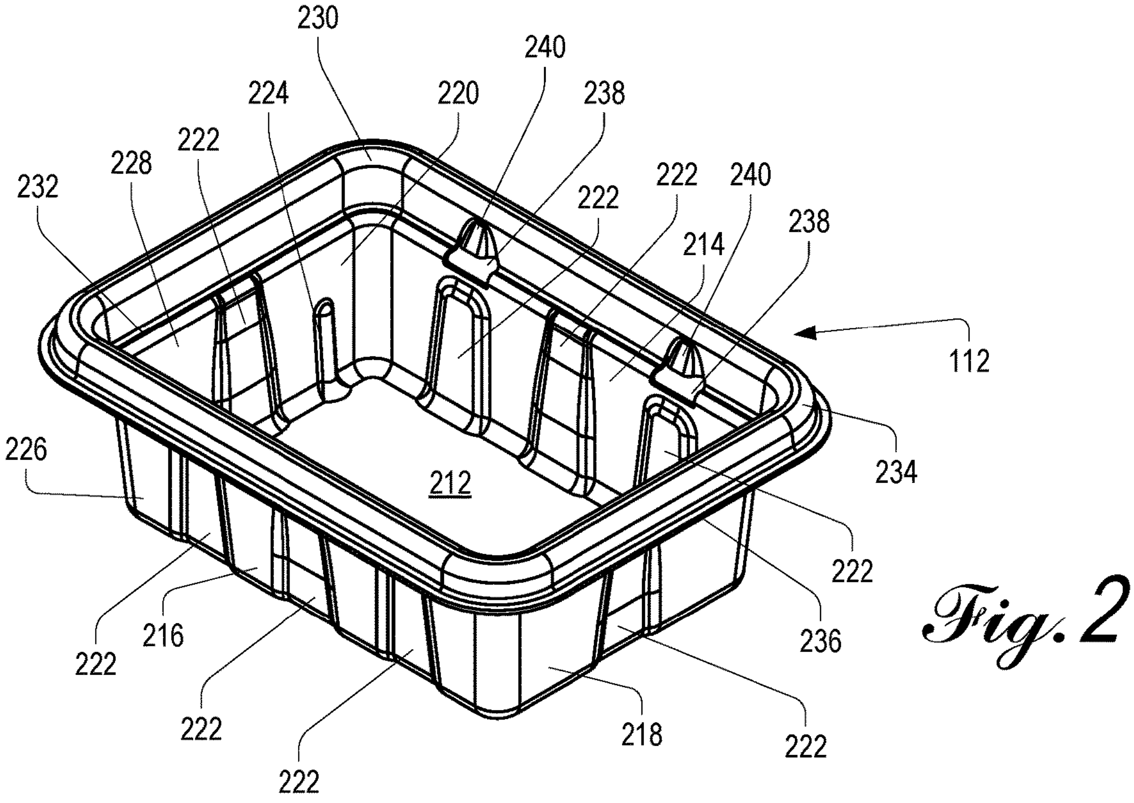
FIG. 2 illustrates an empty shell of a pipette tip rack according to the invention.

As illustrated in FIG. 2, the shell 112 includes various features to facilitate its use as a pipette tip rack shell. The shell has a substantially flat and generally rectangular bottom surface 212, with four side walls 214, 216, 218, and 220 extending upward therefrom at an obtuse angle. Two of the side walls 214 and 216 are longer than the other two side walls 218 and 220, thereby defining an interior cavity of the shell that is larger near the tops of the side walls 214-220 than near the bottom. This is a standard and traditional shape for a pipette tip rack shell, and in a pipette tip rack according to the invention it facilitates molding and mold release, and is well suited to receive a tip deck and an array of pipette tips as described in further detail below.

The shell 112 includes a plurality of ribs 222 and 224, which as shown in FIG. 2 are inward-facing. The ribs 222-224 help to rigidify the shell, preventing collapse or deformation when a pipette is used to mount tips from the pipette tip rack 10. As illustrated in FIG. 2, the two longer sidewalls 214-216 each have three ribs 222 that extend inwardly toward the interior cavity from the respective sidewalls, and appear as depressions on an exterior surface 226 of the shell 112 and as protrusions on an interior surface 228 of the shell 112. Similarly, each of the two shorter sidewalls 218-220 each has a single such rib 222.

Additionally, the shell 112 includes two further ribs 224 on each of the two shorter sidewalls, each extending upward from the bottom surface 212 of the shell 112. These further ribs 224 are less intended for structural rigidity, and more intended to prevent stacks of rack shells made during the manufacturing, shipping, or handling processes from nesting so firmly together that they are difficult to separate. The further ribs 224, as shown, protrude inwardly from the sidewalls 218-220 and are made from thicker material, thus not being present as depressions on the exterior surface 226.

The ribs illustrated in FIG. 2 and described herein represent one possible embodiment; in particular, it will be noted that the illustrated ribs 222-224 originate at the bottom surface 212 and extend upward along the sidewalls 214-220. Other ribs, or additional ribs, in various configurations are possible and would meet the objectives of the present invention. Other such rib configurations, including protrusions and depressions originating near an open top end 230 of the shell or elsewhere on the sidewalls 214-220, are deemed to be within the scope of the invention.

Figure 4:
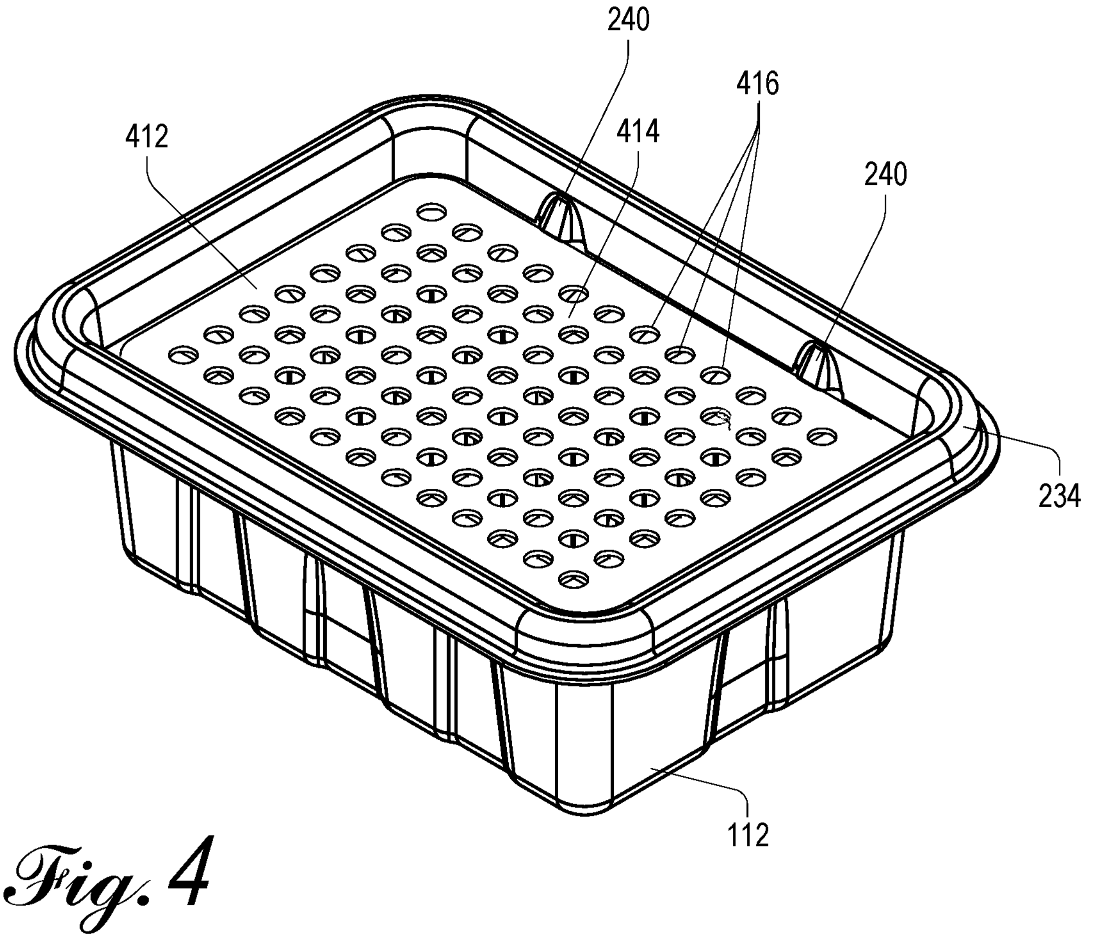
FIG. 4 represents a shell of a pipette tip rack according to the invention, with a tip deck inserted into and held within the shell.

Each of the four sidewalls 214-220 flares outward near the open top end 230 of the shell 112, forming a peripheral shoulder 232 around the interior surface 228. This peripheral shoulder is configured to receive a tip deck (FIG. 4). As shown in FIG. 2, the peripheral shoulder 232 is substantially continuous around the perimeter of the shell 112, but it need not be so configured—it would be sufficient for the sidewalls 214-220 to flare inwardly at spaced locations, so long as the inwardly flared portions are strong enough to hold a pipette tip deck according to the invention.

In the illustrated embodiment, the four sidewalls 214-220 extend further upward from the peripheral shoulder 232, forming a rounded upward-facing lip 234 and an outward-facing flange 236 around the lip 234. The lip 234 and flange 236 are configured to receive mating surfaces of the lid 114, as will be described in further detail below.

Also present in the rack shell 112 illustrated in FIG. 2 are a plurality of apertures 238 defined by the longer sidewalls 214-216 at the peripheral shoulder 232. Between each of the apertures and the top end 230 of the shell 112 is a retention protrusion 240 extending inward from the respective sidewall. The apertures 238 and protrusions 240 serve to retain a tip deck within the shell 112 as will be shown in further detail in connection with FIG. 4.

Figure 3:
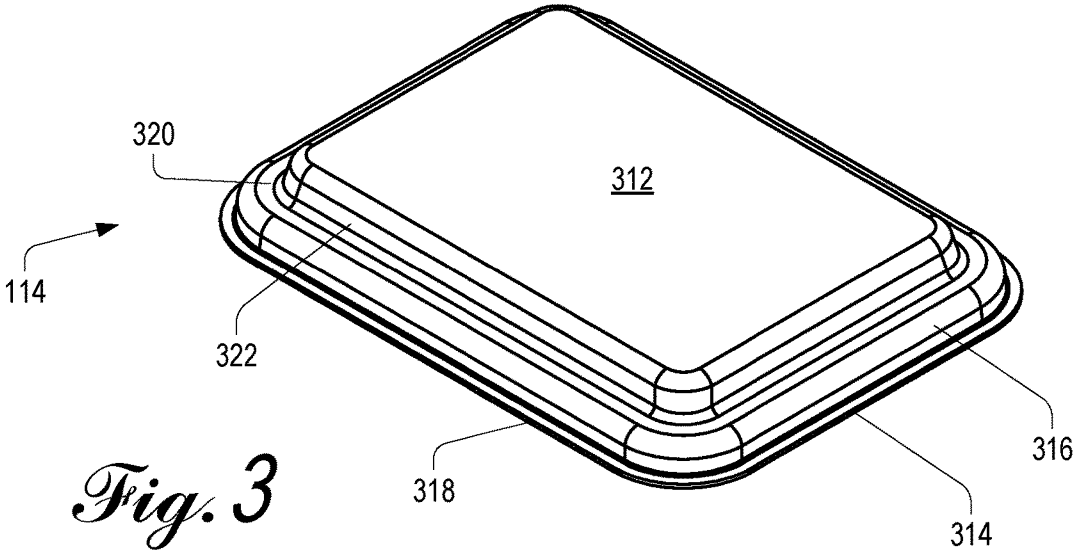
FIG. 3 illustrates a lid for a pipette tip rack according to the invention.
Figure 6:
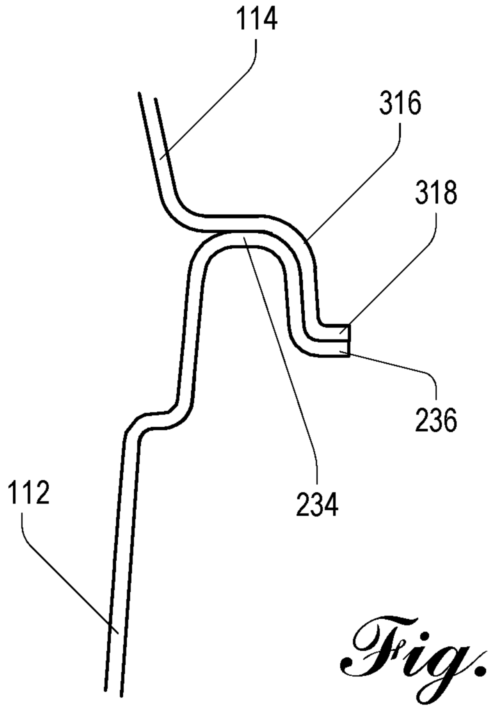
FIG. 6 represents a cutaway view of a portion of a tip rack according to the invention where a lid meets a shell.

Referring now to FIG. 3, the lid 114 for a pipette tip rack 110 according to the invention is shown. The lid 114 has a generally flat top surface 312—although in various embodiments the top surface 312 may have protrusions, depressions, or embossed or debossed areas as desired. Around a bottom portion 314 of the lid 114 is found a peripheral lip structure 316 and an outward-extending flange 318. The lip structure 316 and flange 318 are configured to couple with and lie flush in a snug fit over the corresponding lip 234 and flange 236 of the body 112, as shown in FIG. 6. The contact between the lip structure 316 and the lip 234, and between the flange 318 and the flange 236 provide a secure frictional fit between the shell 112 and the lid 114, preventing inadvertent dislocation of the lid, protecting the interior of the rack 110 against the intrusion of some dust and contaminants, while still allowing the lid 114 to be easily and readily removed from the shell 112 when desired. In an embodiment of the invention, there is at least one small protrusion found on an inner or outer surface of one or more sides of the lid, which would serve to prevent inordinately tight stacking of lid components during manufacturing, shipping, and handling.

As shown, the lid 114 further includes a stepped configuration with an intermediate surface 320 and intermediate wall 322, but this configuration is primarily aesthetic, and as long as the lid 114 includes the lip structure 316 and flange 318, as well as the top surface 312, and the lid has a height sufficient to accommodate an array of pipette tips inside the pipette tip rack 110, various contours and shapes for the periphery of the lid 114 can be imagined and would be within the scope of this invention.

FIG. 4 shows the shell 112 of a pipette tip rack 110 according to the invention with a tip deck 412 inserted. The tip deck 412, which is preferably molded from a sufficiently rigid, lightweight, and recyclable polymer such as polypropylene (or other suitable materials), has a substantially flat upper surface 414 and defining an array of openings 416 to accommodate a plurality of pipette tips. As with traditional pipette tip racks, the array of openings 416 is arranged in an 8×12 matrix, each opening configured to receive a single pipette tip. Of course, other configurations are possible—the tips and openings need not be arranged in a rectangular array, and fewer or more than 96 tips (for example 384 or 1536 tips) may be loaded into a similar rack with an adapted tip deck.

The tip deck 412 is held in the body 112 of the pipette tip rack 110 in a flat, horizontal orientation against a top surface of the shoulder 232 defined by the sidewalls 214-220 of the body 112; for stability, the tip deck 412 should rest against the shoulder 232 (FIG. 2) along at least two of the four opposing sidewalls 214-220, but preferably the shoulder 232 extends around all four sidewalls 214-220. As shown in FIG. 2 and in FIG. 4, a plurality of inward-facing sidewall retention protrusions or "snap features" 240 above the shoulder 232 keep the tip deck 412 in place. When the tip deck 412 is inserted into the body 112 of the pipette tip rack 110 during the manufacturing or assembly process, the deck 412 can be snapped past the retention protrusions 240 to rest upon the shoulder 232. The inward-facing retention protrusions 240 (and the rest of the body 112) are resilient enough to snap back into position and hold the deck 412 in place between the shoulder 232 and the protrusions 240.

The apertures 238 (FIG. 2) are provided to ensure the tip deck 412 snaps securely into place; each of the retention protrusions 240 has a sloped top surface 242 to enable pushing the tip deck into place past the protrusions. Once the tip deck 412 is past the protrusions, it snaps into place and is generally unable to be easily removed because the apertures 238 define a relatively sharp angle on lower edges 244 of the protrusions, and the protrusions extend over the edges of the tip deck 412 to create an interference fit. In an embodiment of the invention, accordingly, the tip deck 412 tends to cover part or all of the apertures 238. If desired, the tip deck 412 can be provided with laterally extending features that enter the apertures 238 enabling an even stronger hold, but with the protrusions resiliently moving into position to cover the edges of the generally rectangular tip deck, such extending features may not be necessary. Moreover, it should be noted that the apertures are not necessarily required to hold a tip deck 412 according to the invention in place; protrusions may be simply formed in place in the sidewalls of the shell, with an interference fit formed as the tip deck is pushed past the uncut protrusions. If desired, even greater structural rigidity can be conferred upon the cellulose shell by using a modified tip deck with extensions that protrude out from the snap feature apertures 238 and grasp the shell exterior, thereby preventing bowing or other deformation of the shell during tip loading.

It may be observed in FIG. 4 that the lip 234 of the shell 112 extends upward from the tip deck 412. Preferably, the lip 234 is sized to allow partial tip loading on a multichannel pipette—i.e., a multichannel pipette may straddle the edge of the rack 110 to mount tips on only some of the channels of the pipette, and the lip 234 is preferably configured to be low enough in height to avoid interference with such a partial tip loading operation. In such a configuration (and as shown in FIG. 5), the array of tips will generally sit on the tip deck 412 with their proximal mount ends extending from the top of the tip deck 412 to above the lip 234, and accordingly, the lid 114 will need to have sufficient height to accommodate those proximal mount ends.

Figure 5:
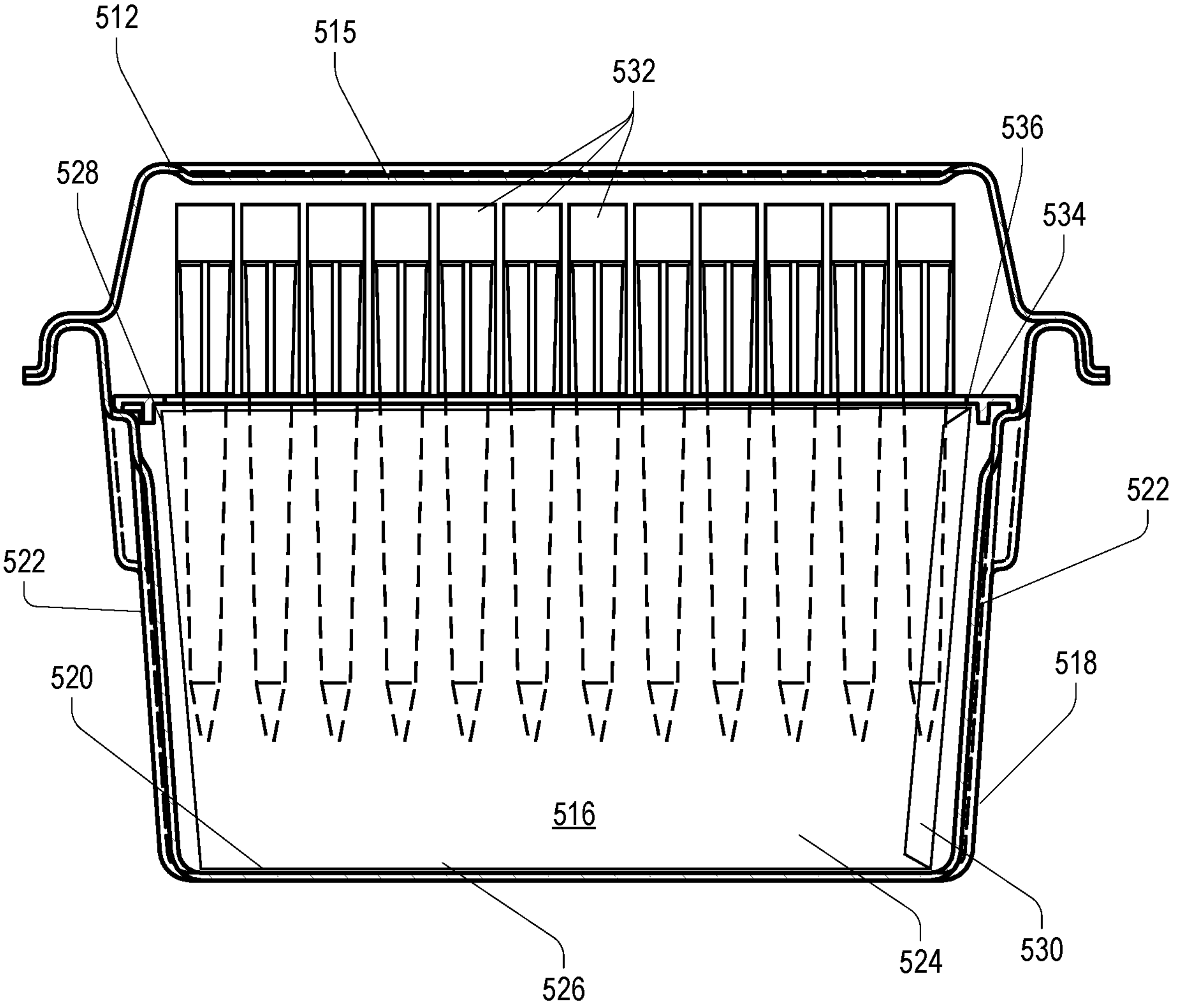
FIG. 5 represents a partial cutaway side view of an embodiment of a pipette tip rack according to the invention.

FIG. 5 illustrates a slightly different embodiment of a tip rack 510 according to the invention; this embodiment is taller than the rack 110 illustrated in FIGS. 1-4 and would accommodate larger pipette tips, such as the illustrated tips 530. The rack lid 512 and shell 518 are shown in cutaway form.

One difference evident in FIG. 5 is that the lid 512 has a different shape from the lid 114 shown in FIG. 3; it includes a single set of vertical walls 514 rather than the stepped configuration of FIG. 3. The lid 512 of FIG. 5 further includes a depression 515 which serves to accommodate a bottom surface of another rack when the racks are stacked. These configurations and others will be understood by the reader to be within the scope of the current invention.

FIG. 5 further shows a tubular sleeve 516 inserted within the shell 518 of the pipette tip rack 510; as illustrated the sleeve is made from a folded and glued piece of paper that rests on an internal bottom surface 520 of the shell and is directly adjacent to the sidewalls 522. The height of this tubular sleeve is specifically configured to allow it to make direct contact with the underside of the tip deck. Although the sleeve is described as "tubular," it is more rigorously described as a truncated rectangular pyramid—with four flat sides 524, each of which is trapezoidal in shape, formed into a configuration that defines a rectangular bottom opening 526 and a larger rectangular top opening 528.

Figure 7:
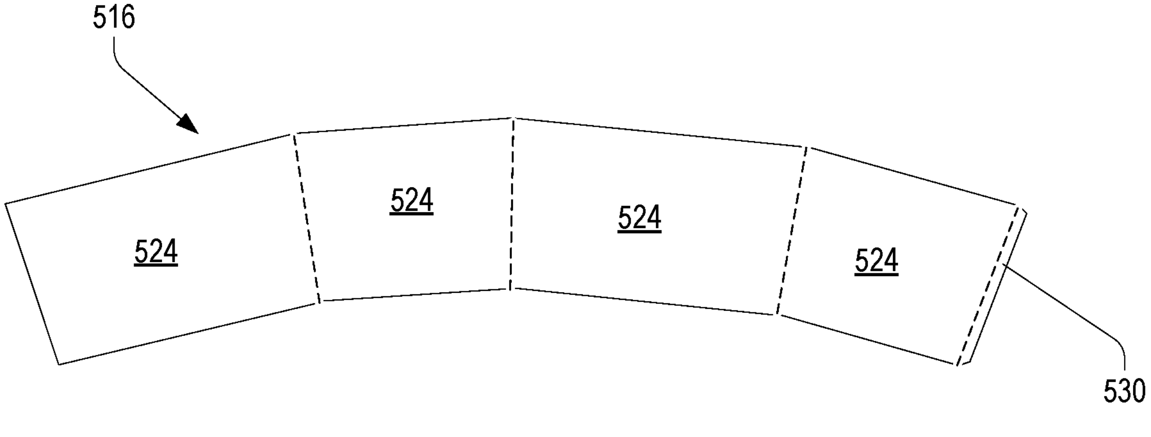
FIG. 7 represents an exemplary paper pattern usable for a tubular sleeve in a pipette tip rack according to the invention.

A suitable pattern 710 for the tubular sleeve 516 is shown in FIG. 7, in which it is apparent that four trapezoidal sides 524 are joined together with an additional flap 530 to facilitate gluing the paper sleeve 516 into its preferred truncated pyramidal shape.

Returning to FIG. 5, it is apparent that there is a relatively tight fit between the sleeve 516 and all four sidewalls 214-220 (FIG. 2) of the shell 518. Accordingly the pipette tips 532 held within the rack 510 according to the invention and resting on a tip deck 534 extend through the array of openings 416 (FIG. 4) and hang downward, with their distal ends extending into the interior cavity of the shell 518 inside the sleeve 516.

It is understood that when a pipette tip rack containing tips is handled, the tips may jostle around in the rack, and sometimes impact, rub against, or rest against one of the sidewalls of a rack. In a pipette tip rack 510 according to the invention, the tubular sleeve 516 is made from a material that is more resistant to abrasion and impacts than the cellulose pulp that forms the lid 512 and the shell 518. Such a material may include various forms of refined paper (containing fewer or smaller fibers), plastic, Tyvek®, or other suitable materials. The sleeve 516 lines the interior of the shell 518 and limits loose fibers from the cellulose material from coming loose and potentially contaminating the pipette tips 530: as the sleeve sits on the bottom surface 520 of the shell 518, the four sides of the sleeve rest against or very near the sidewalls of the shell 518.

Additionally, the sleeve 516 has an upper end 536 that sits directly below the tip deck 534, thereby providing additional support and structure to the tip deck 534 and the pipette tip rack 510 as a user depresses a pipette into the rack 510 to mount the tips 530.

Figure 8:
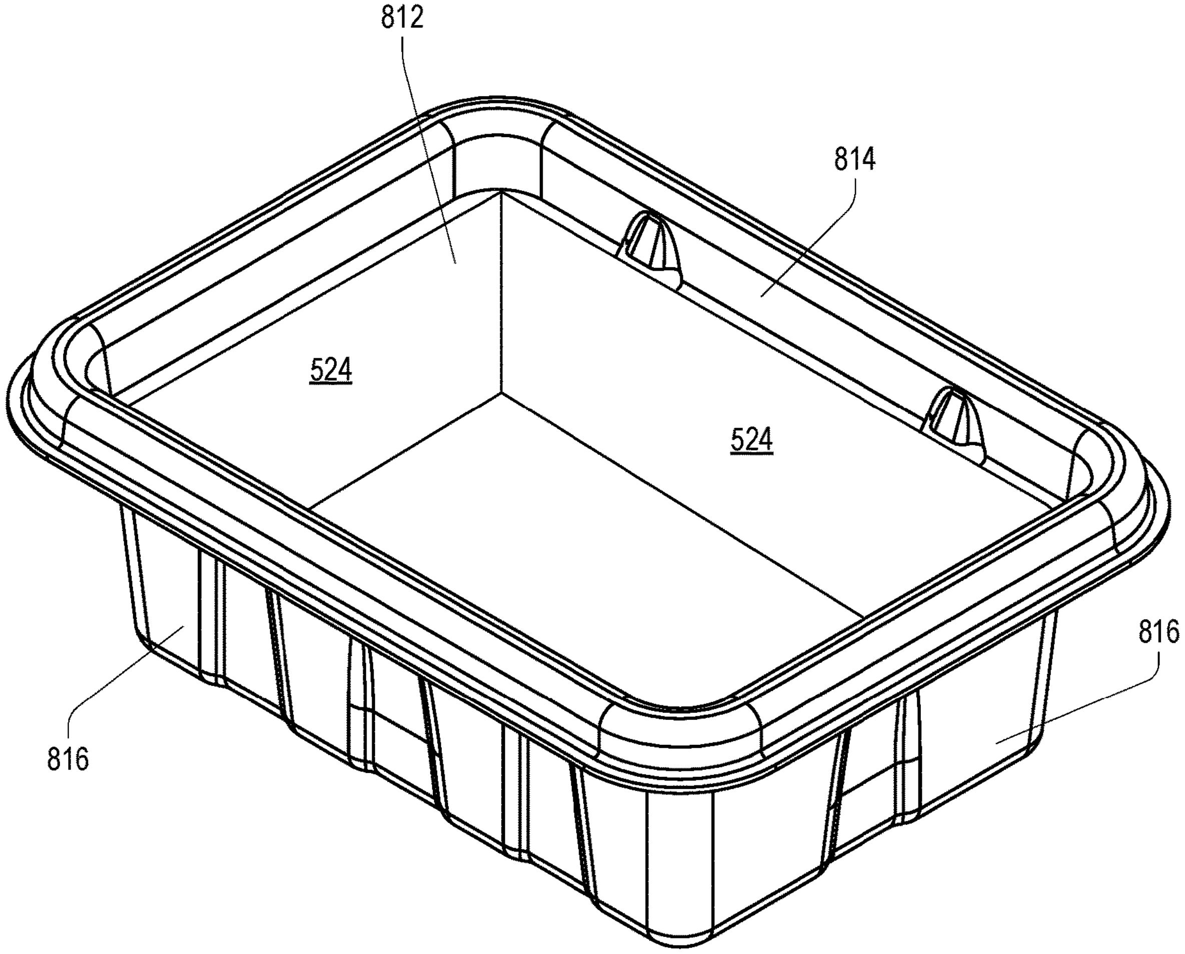
FIG. 8 illustrates a shell of a pipette tip rack according to the invention, with a tubular sleeve in place within the shell.

FIG. 8 shows an overhead view of a sleeve 812 inserted into a rack shell 814 according to the invention. As can be seen, the sleeve rests snugly within the rack shell slightly below the apertures, protrusions, and shoulder intended to receive a tip deck, but in direct contact with the underside of the tip deck and each of the trapezoidal sides 524 (FIG. 45) of the sleeve 516 rests on or near a corresponding sidewall 816 of the shell 814.

Because the structure of a pipette tip rack according to the invention is primarily made from cellulose fiber, it can be advantageous to include additives in or coatings on the molded pulp to (1) improve the rack's performance in wet or moist conditions, and (2) lock or encapsulate cellulose fibers so they are less free to come loose from the rack 110 (FIG. 1) and contaminate the pipette tips stored therein.

One such possible additive is an alkyl ketene dimer (AKD), which when added in small proportions to the cellulose fiber pulp, which is commonly used in paper and cardboard to improve moisture resistance. When used in small portions in a pipette tip rack according to the invention, it improves the moisture resistance of the body 112 and lid 114 while retaining adequate biodegradability.

Various coatings are also possible, including silicones, oils, polymerized oils, and aqueous coatings, that may not only be water resistant but would encapsulate fibers from the cellulose pulp. Such coatings may be applied to the interior, the exterior, or all surfaces of a pipette tip rack according to the invention. It is expected that an advantageously used coating may reduce to some extent, but certainly not eliminate, the biodegradability characteristics of a tip rack according to the invention.

For adequate strength, it is envisioned that a pipette tip rack according to the invention would include molded cellulose pulp parts—including the walls and surfaces of the rack shell and lid—that are advantageously between approximately 0.75 mm and 1.25 mm in thickness, though some portions of a rack according to the invention (including, for example, the internal ribs 224 of FIG. 2) may be thinner or thicker. The foregoing range of thicknesses has been found to provide an advantageous relationship between weight (and accordingly, expense) and strength.

It should be observed that while the foregoing detailed description of various embodiments of the present invention is set forth in some detail, the invention is not limited to those details and a pipette tip rack with characteristics according to the invention can differ from the disclosed embodiments in numerous ways. Similar pipette tip racks using may be fabricated in comparable or different ways, including via folded flat fibrous stock, and may differ in various morphological characteristics. Although the invention is described and illustrated in the context of a rack for an array of 96 disposable air displacement pipette tips, it is equally applicable to other types of other pipette tips and articles, including positive displacement tips, sample tubes, and other like items, or arrays or rows of more or fewer items. It should be noted that functional distinctions are made above for purposes of explanation and clarity; structural distinctions in a system or method according to the invention may not be drawn along the same boundaries. Hence, the appropriate scope hereof is deemed to be in accordance with the claims as set forth below.

What is claimed is:

1. A pipette tip rack, comprising:

a shell having an open top end and an interior cavity, the shell having an interior surface defining a shoulder near the open top end and including four sidewalls and a generally rectangular bottom surface;

a flat tip deck supported by the shoulder within the interior cavity; and a sleeve positioned within the interior cavity below the tip deck, such that the sleeve rests on the bottom surface of the shell, has four sides adjacent to the four sidewalls of the shell, and provides additional support to the tip deck;

wherein the shell is molded from a biodegradable first material comprising cellulose fiber and defining a plurality of inward facing retention protrusions positioned on the sidewalls of the shell above the shoulder and the tip deck:

wherein the sleeve is fabricated from a second material that is more resistant to abrasion than the first material; and Wherein the retention protrusions are cooperative with the shoulder to hold the tip deck in place between the shoulder and the retention protrusions, with the retention protrusions holding the tip deck against the shoulder.

2. The pipette tip rack of claim 1, further comprising a lid molded from the first material.

3. The pipette tip rack of claim 1, wherein the shoulder is substantially continuous around a perimeter of the interior cavity.

4. The pipette tip rack of claim 1, further comprising an array of pipette tips, each pipette tip supported on the tip deck within a corresponding opening in the tip deck, wherein the pipette tips have distal ends that extend below the tip deck into the interior cavity of the shell inside the sleeve.

5. The pipette tip rack of claim 1, wherein at least two of the sidewalls of the shell each include at least one rib.

6. The pipette tip rack of claim 5, wherein the at least one rib is defined by a depression in an exterior surface of the shell.

7. The pipette tip rack of claim 5, wherein the at least one rib is defined by a protrusion in an exterior surface of the shell.

8. The pipette tip rack of claim 2, wherein the shell comprises an upward facing lip at the top end of the shell and an outward facing flange around the lip.

9. The pipette tip rack of claim 8, wherein the lid comprises a lip and a flange, wherein the lip and flange of the lid are configured to fit flush over the corresponding lip and flange of the shell.

10. The pipette tip rack of claim 1, further comprising a plurality of apertures each corresponding to one of the plurality of retention protrusions, wherein each of the apertures is cut into the corresponding retention protrusion below a sloped top surface thereof.

11. The pipette tip rack of claim 10, wherein the apertures are configured to allow the retention protrusions to form an interference fit with respect to the tip deck, when the tip deck is resting upon the shoulder of the shell.

12. The pipette tip rack of claim 1, wherein the sleeve comprises a tubular structure having the shape of a truncated rectangular pyramid with four trapezoidal sides.

13. The pipette tip rack of claim 12, wherein each of the four trapezoidal sides of the sleeve rests adjacent to and inside one of the four sidewalls of the shell.

14. The pipette tip rack of claim 12, wherein the sleeve is made from a folded paper pattern.

15. The pipette tip rack of claim 2, wherein the material of the lid comprises cellulose fiber.

16. The pipette tip rack of claim 15, wherein the first material further comprises a water-resistant additive.

17. The pipette tip rack of claim 15, wherein the first material is at least partially coated with a water resistant coating.

18. The pipette tip rack of claim 17, wherein the water resistant coating is applied to an exterior surface of the shell.

19. The pipette tip rack of claim 15, wherein the first material is at least partially coated with a fiber encapsulating coating.

20. The pipette tip rack of claim 19, wherein the fiber encapsulating coating is applied to the interior surface of the shell.

21. The pipette tip rack of claim 2, wherein the material of the shell and of the lid is compostable.

22. The pipette tip rack of claim 2, wherein the first material of the shell and of the lid is recyclable.

23. The pipette tip rack of claim 2, wherein a substantial majority of the material in the shell and in the lid has a thickness between approximately 0.5 mm and 1.5 mm.

24. The pipette tip rack of claim 2, wherein a substantial majority of the material in the shell and in the lid has a thickness between approximately 0.75 mm and 1.25 mm.

* * * * *